June 2, 1953  J. D. MADARAS  2,640,624
PRESSURE VESSEL AND PRESSURE HEAD THEREFOR
Filed Nov. 7, 1949  2 Sheets-Sheet 1
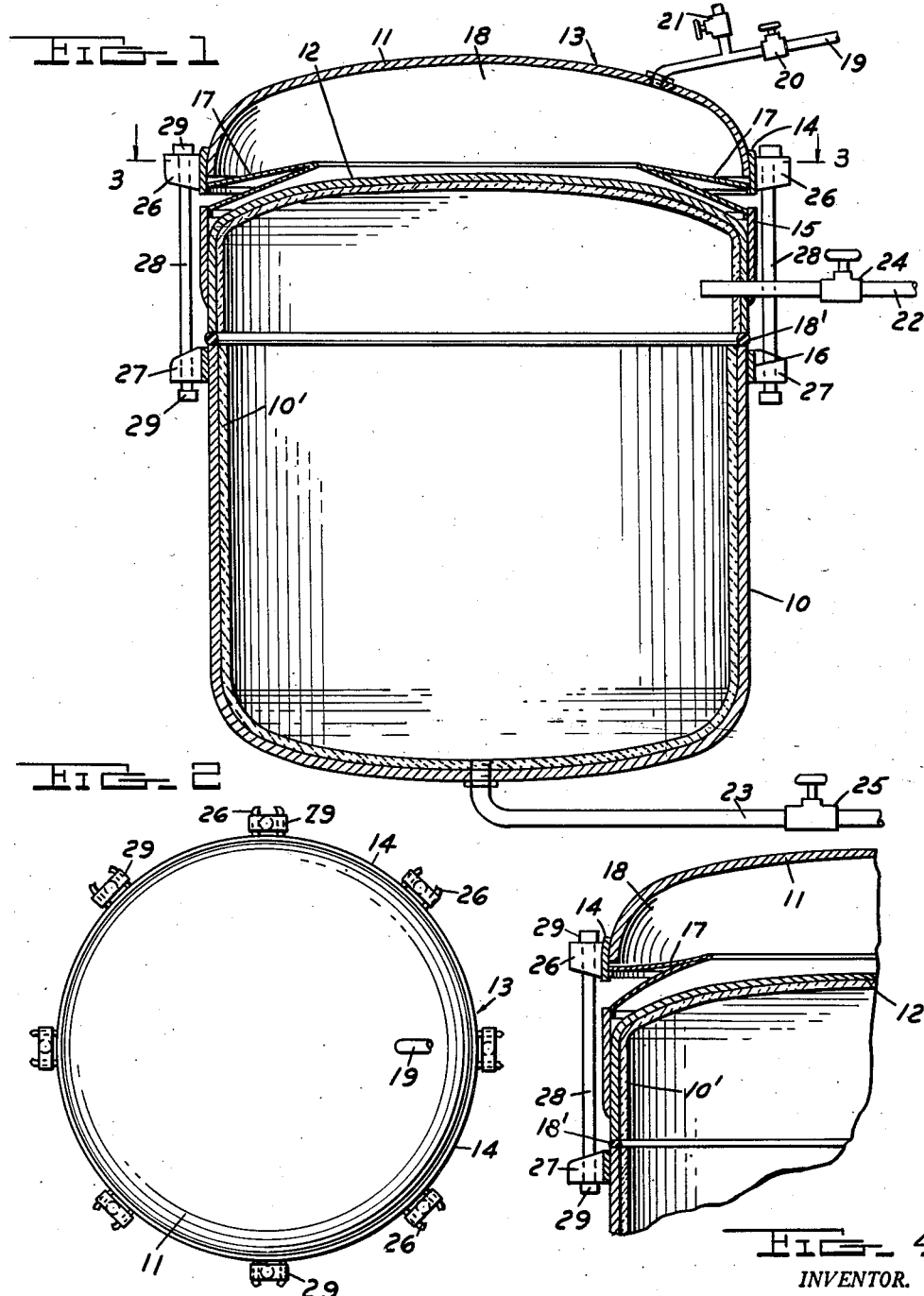
INVENTOR.
JULIUS D. MADARAS
BY
Whittemore Hulbert & Belknap
ATTORNEYS

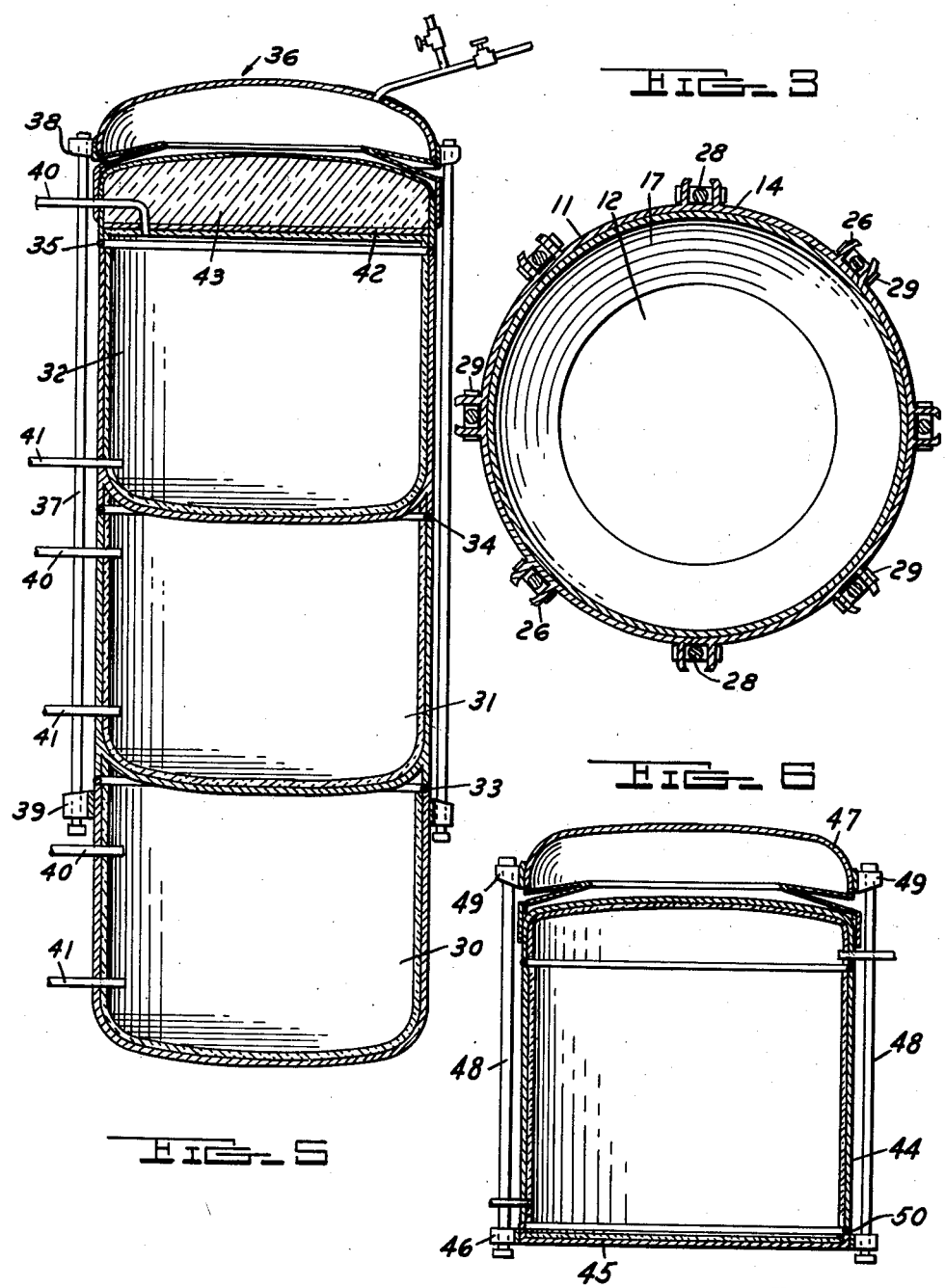
June 2, 1953  J. D. MADARAS  2,640,624
PRESSURE VESSEL AND PRESSURE HEAD THEREFOR
Filed Nov. 7, 1949  2 Sheets-Sheet 2
INVENTOR.
JULIUS D. MADARAS
BY
Whittemore Hulbert & Belknap
ATTORNEYS Patented June 2, 1953

2,640,624

UNITED STATES PATENT OFFICE 2,640,624

PRESSURE VESSEL AND PRESSURE HEAD THEREFOR

Julius D. Madaras, Detroit, Mich., assignor to Madaras Corporation, Wilmington, Del., a corporation of Delaware Application November 7, 1949, Serial No. 125,931

4 Claims. (Cl. 220—24)

1

The invention relates to pressure vessels or pressure retorts adapted to withstand high internal pressures commonly employed in various industrial uses, and relates particularly to means for forming a fluid-tight closure for such a vessel or retort. A particular object of this invention is to provide a closure or pressure head for a pressure vessel such that it may be quickly and easily opened or closed without the necessity of individually tightening or loosening a number of separate bolts.

A further object is to provide a construction whereby fluid pressure, either hydraulic or gas pressure or both, is utilized to force the closure member into sealing engagement with the main body of the vessel.

A still further object is to obtain a simple construction of the type mentioned wherein no precision machine work is required, as would be necessary if a conventional hydraulic cylinder were used.

With these and other objectives in view, the invention consists in the construction as hereinafter set forth and illustrated in the accompanying drawings, wherein:

Fig. 1 is a vertical section of a pressure vessel equipped with a pressure head in accordance with my invention;

Fig. 2 is a top plan view;

Fig. 3 is a horizontal section taken on line 3—3 of Fig. 1;

Fig. 4 is a sectional view showing some of the elements of Fig. 1 in a slightly different position;

Fig. 5 shows a modified form of my device; and

Fig. 6 is a vertical section of still another modification.

As illustrated in Fig. 1, 10 is the outer casing of a pressure vessel or pressure retort which, as shown, is cylindrical in shape, but which may be of any desired shape or dimension. The retort is provided with a refractory lining 10' which may be formed of any suitable refractory material. An upper head member 11 and refractory lined lower head member 12 form the two parts of the closure, and the assembly of the two parts forms the pressure head 13. Although parts 11 and 12 are illustrated as dished members, they may be of any shape that best suits the purpose for which the retort is to be applied. Rings 14, 15 and 16 are secured respectively to head members 11 and 12 and to the casing 10, and serve as reinforcing members therefor. An accordion type, flexible or expandable annular joint 17 is welded or otherwise tightly secured throughout its outer peripheral portions to rings

2

14 and 15, thereby connecting parts 11 and 12 to form the assembled pressure head 13, and forming a fluid-tight, expandable chamber 18 therein. Although I prefer to secure the flexible joint 17 to the rings 14 and 15, it would be possible, nevertheless, to secure the joint directly to the upper head member 11 and lower head member 12.

Connecting chamber 18 to a suitable source of fluid under pressure (not shown) is a conduit 19 provided with an inlet valve 20 and outlet valve 21. These valves may be of any desired construction, and may be either manually or mechanically operated. Conduits 22 and 23 provide means for introducing fluid under pressure into the retort and for releasing the same, said conduits being respectively provided with control valves 24 and 25.

Secured to reinforcing ring 14 (or if preferred, directly to upper head 11) are a suitable number of brackets 26, while a corresponding number of similar brackets 27 are secured to reinforcing ring 16 (or directly to the casing 10). Tension rods 28 provided with heads 29 on opposite ends are adapted to be held between each pair of brackets 26 and 27, thereby connecting the upper head member 11 of the pressure head to the retort. A suitable sealing gasket 18' is provided between the lower head member 12 and the casing 10, to form a fluid-tight seal therebetween. The tension rods may be manually, mechanically, magnetically, electrically, or otherwise operated, and may be so designed that they may be folded away if desired. In addition, other obvious modifications in construction and design may be made without departing from the scope of my invention.

In operation, the opening and closing of the retort is as follows. Pressure chamber 18 of the pressure head 13 is filled with liquid to reduce the void, and the pressure head is placed in position on the retort 10. At this stage the expandable pressure chamber 18 and expandable joint 17 are in a relatively contracted position as shown in Fig. 1. The tension rods 28 are then engaged between their respective pairs of brackets 26 and 27, the construction being such that this operation may be quickly and easily accomplished without the necessity of tightening any bolts. Valve 20 is then opened to admit fluid under pressure into the chamber 18. This pressure fluid may consist of compressed air, gas or liquid as desired. The pressure that is thus built up in chamber 18 tends to force the head members 11 and 12 further apart, such relative movement being permitted by flexible joint 17. As soon as any slight clearance between tension rod heads 29 and brackets 26 and 27 has been taken up, further upward movement of upper head member 11 will be prevented by tension rods 28. Further increase of pressure within chamber 18 will result in forcing lower head member 12 down on the gasket 18' to form a gas-tight seal with the retort. Both the chamber 18 and joint 17 are now in a relatively expanded position as illustrated in Fig. 4. Thus it is seen that any desired force may be exerted upon lower head member 12 to seal the retort by merely increasing the pressure within chamber 18 in the pressure head assembly. In practice, the pressure within chamber 18 is maintained at slightly higher value than the maximum pressure to be used within retort 10, thus assuring a gas-tight closure for the retort at all times.

In order to open the retort it is only necessary to open release valve 21, whereby the gas or or fluid will leave chamber 18 and relieve the tension on the rods 28. These rods may then be disengaged from their respective brackets and the pressure head removed.

From the foregoing description it will be apparent that I have provided a simple and efficient means of forming a gas-tight closure for pressure vessels. Whereas my improved pressure head assembly may be applied to any type of pressure vessel or retort designed for performing any desired operation, I have found it particularly useful when applied to a pressure retort designed to accomplish the reduction of metallic oxides or ores, such as iron ore for example. A retort of this type is illustrated in Fig. 1 wherein the retort is provided with a conduit 22 connected to a source of hot reducing gas under pressure. Another conduit 23 is provided as an outlet for the gas. The conduits are respectively provided with control valves 24 and 25, which may be mechanically or otherwise controlled to operate in timed relation to one another. In operation, a charge of iron ore is placed in the retort 10, which is then closed by means of pressure head 13 in the manner above described. Sufficient pressure is introduced into chamber 18 of the pressure head to assure an excess of pressure over any that will subsequently be introduced into the retort 10. The iron ore is heated in any suitable manner to the best temperature for reduction, at which time the hot reducing gas is injected into the retort. The valves 24 and 25 are alternatively operated in such a way as to cause a pulsating pressure within the retort 10. Thus when inlet valve 24 is open, exhaust valve 25 is closed, and the gas pressure within the retort is built up until it penetrates the voids in the entire mass of ore. Valve 24 is then closed and exhaust valve 25 is opened to permit the used gas to escape. By alternately opening and closing the two valves, fresh gas is repeatedly injected while the used gas is exhausted, thus obtaining a very efficient and complete reaction. After the desired reduction has been completed the gas is exhausted from the retort and the pressure head is removed in the manner above described.

Fig. 5 illustrates a modification of my invention wherein a plurality of refractory lined pressure vessels or retorts are stacked one above the other. As specifically illustrated, three vessels 30, 31 and 32 are stacked one above the other, and suitable means such as gaskets 33 and 34 are provided to insure a gas-tight seal between the respective vessels. The top vessel 32 is provided with a sealing gasket 35 and a pressure head assembly 36 that is similar in construction and operation to the previously described pressure head 13. Tension rods 37 are held between brackets 38 on the pressure head and brackets 39 on the bottom vessel 30, thereby securing the pressure head and the three vessels together as a unit. Thus pressure supplied to pressure head 36 will act upon the entire unit to assure gas-tight sealing of the respective vessels. The stacked vessels are respectively provided with inlet conduits 40 and outlet conduits 41 for introducing pulsating gas pressure into each vessel as previously described.

In some cases it is desirable to provide extra insulation for protection of the lower head member and to reduce heat loss from the vessel. Thus as shown in Fig. 5, a partition 42 extends across the lower head member forming a compartment which is filled with suitable insulating material 43. The inlet conduit 40 forms a passage through the insulation for introducing the hot gases into the vessel.

In Fig. 6 is shown a modified type of vessel 44 having a removable bottom 45 on which are mounted brackets 46. A pressure head 47 of the above described construction forms the closure for the vessel, the arrangement being such that the tension rods 48 extend between the brackets 49 on the head and the brackets 46 on the bottom to hold the respective members in place. A suitable sealing gasket 50 is provided between the removable bottom and the vessel.

In each of the above described modifications it is evident that the pressure within the head may be maintained at any desired value to assure that a gas-tight system is maintained at all times. In some applications it will be sufficient to apply a constant predetermined tension on the tension rods by maintaining a constant pressure within the head. On the other hand, if the pressure within the vessel is fluctuating, the pressure within the head may be regulated so as to increase or decrease in accordance with the fluctuating pressure within the vessel.

The drawings and foregoing specification constitute a full description of my improved pressure vessel and pressure head such as to enable anyone skilled in the art to practice the invention, the scope of which is indicated by the appended claims.

What I claim as my invention is:

1. A closure for pressure retorts comprising a head directly engaging the retort, a dome-shaped super-head, an accordion type flexible sealing connection between the periphery of said super-head and said directly engaged head permitting a limited relative axial movement thereof, a member in fixed relation to said retort forming an abutment for said super-head, and means for admitting or withdrawing pressure fluid into or out from the chamber between said heads to respectively clamp or release the first mentioned head in relation to said retort.

2. The construction as in claim 2 in which the accordion type flexible sealing connection is within the super-head and extends radially inward from its peripheral connections with said heads.

3. A closure for pressure retorts comprising a head directly engaging the retort, a dome-shaped super-head, a flexible sealing connection within the super-head formed by a pair of superposed annular disk portions connected with each other at the inner periphery thereof and respectively to the head and super-head at their outer peripheries thereby permitting a limited relative axial movement of said heads, a member in fixed relation to said retort forming an abutment for said super-head, and means for admitting or withdrawing pressure fluid into or out from the chamber between said heads to respectively clamp or release the first mentioned head in relation to said retort.

4. The construction as in claim 3 in which the flexible sealing connection is attached by welding to the heads.

JULIUS D. MADARAS.

References Cited in the file of this patent

UNITED STATES PATENTS

| Number | Name | Date |
|---|---|---|
| 1,197,496 | Jobling | Sept. 5, 1916 |
| 1,665,827 | Tillman | Apr. 10, 1928 |
| 1,992,612 | Hall | Feb. 26, 1935 |
| 2,166,999 | Needham et al. | July 25, 1939 |
| 2,241,843 | Buddrus et al. | May 13, 1941 |
| 2,404,468 | Vokes et al. | July 23, 1946 |
| 2,489,844 | Zallea | Nov. 29, 1949 |